United States Patent [19]

Cizek et al.

[11] Patent Number: 5,232,429
[45] Date of Patent: Aug. 3, 1993

[54] METHOD AND APPARATUS FOR MAKING A CONTINUOUS TUBE OF FLEXIBLE SHEET MATERIAL

[75] Inventors: Jaromir Cizek; Nicolaas J. J. van Rensburg, both of Port Elizabeth, South Africa

[73] Assignee: CSIR, Pretoria, South Africa

[21] Appl. No.: 831,833

[22] Filed: Feb. 6, 1992

[30] Foreign Application Priority Data

Feb. 7, 1991 [ZA] South Africa .................. 91/0921

[51] Int. Cl.⁵ .................. B31C 3/00; B31C 3/04; B65H 81/08; D05B 23/00
[52] U.S. Cl. .................. 493/299; 156/195; 156/428; 112/63
[58] Field of Search ............... 493/299, 300, 301, 302; 156/189, 195, 425, 428; 112/63

[56] References Cited

U.S. PATENT DOCUMENTS

| | | | |
|---|---|---|---|
| 2,585,762 | 2/1952 | Gardner | 493/299 |
| 3,052,197 | 9/1962 | Judelson | 112/63 |
| 3,383,261 | 5/1968 | Arnold | 156/428 |
| 3,533,882 | 10/1970 | Riese | 493/299 |
| 3,673,024 | 6/1972 | Eriksson | 156/195 |
| 4,220,077 | 9/1980 | Miller et al. | 493/299 |
| 4,401,041 | 8/1983 | de Polo | 112/63 |
| 4,493,749 | 1/1985 | Brezina | 156/195 |
| 4,639,165 | 1/1986 | Flecknoe-Brown | 405/45 |

FOREIGN PATENT DOCUMENTS 1429890 3/1976 United Kingdom.
2034432 6/1980 United Kingdom.
1580619 12/1980 United Kingdom.

*Primary Examiner*—William E. Terrell
*Attorney, Agent, or Firm*—Ladas & Parry

[57] ABSTRACT

Method and apparatus for making tubes from flexible textile sheets by which a sheet is helically wound around two or more non-rotatable support bars. Feed rollers contacting two or more helical convolutions wind the sheet so that adjacent helical convolutions overlap and also maintain the tube upstream of the feed rollers in tension to progress the tube axially along the support bars. As the sheet is wound into helical form, successive helical convolutions are sewn together to form a continuous tube.

2 Claims, 8 Drawing Sheets

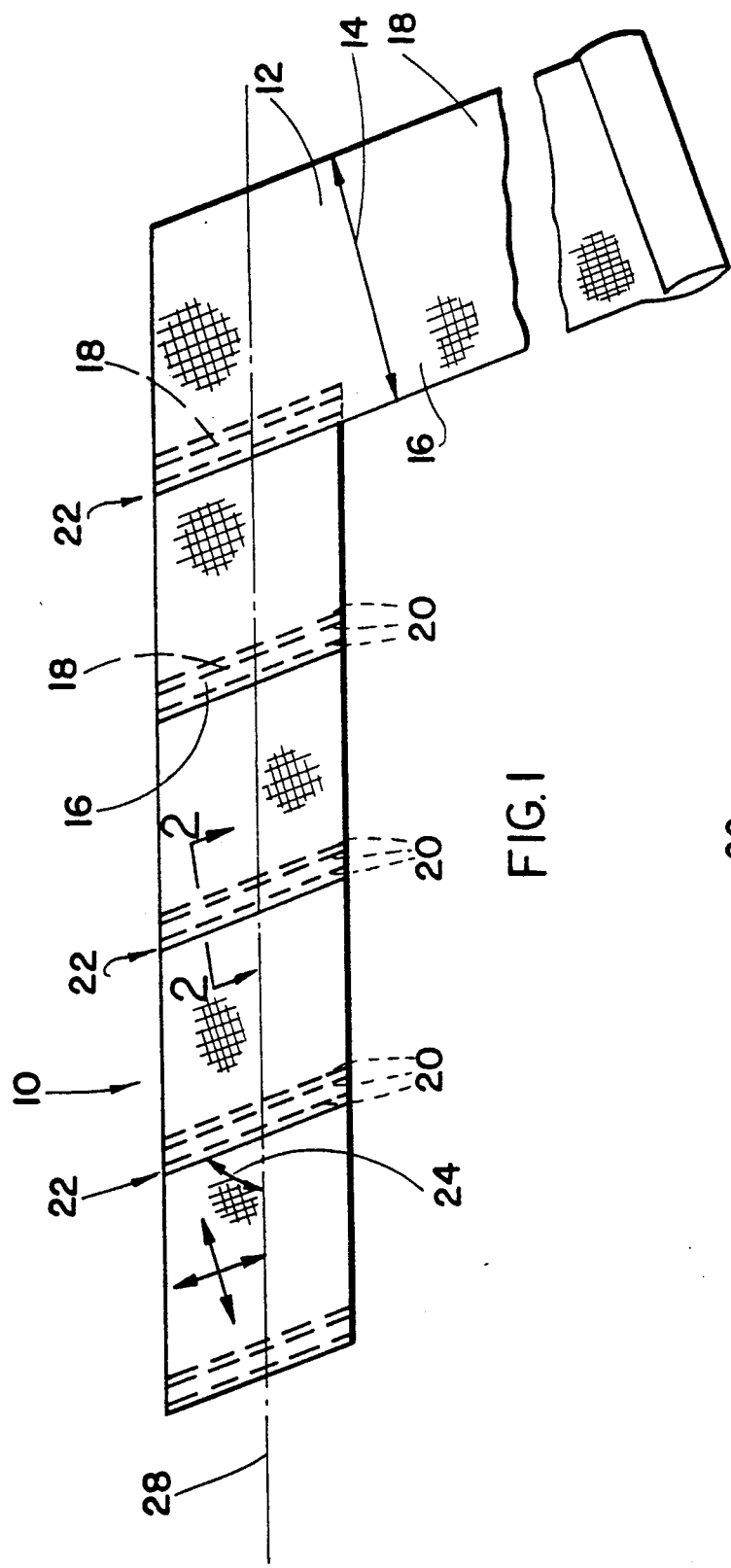
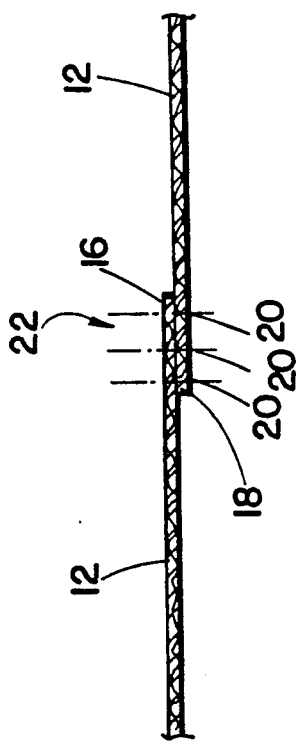
FIG. 1
FIG. 2

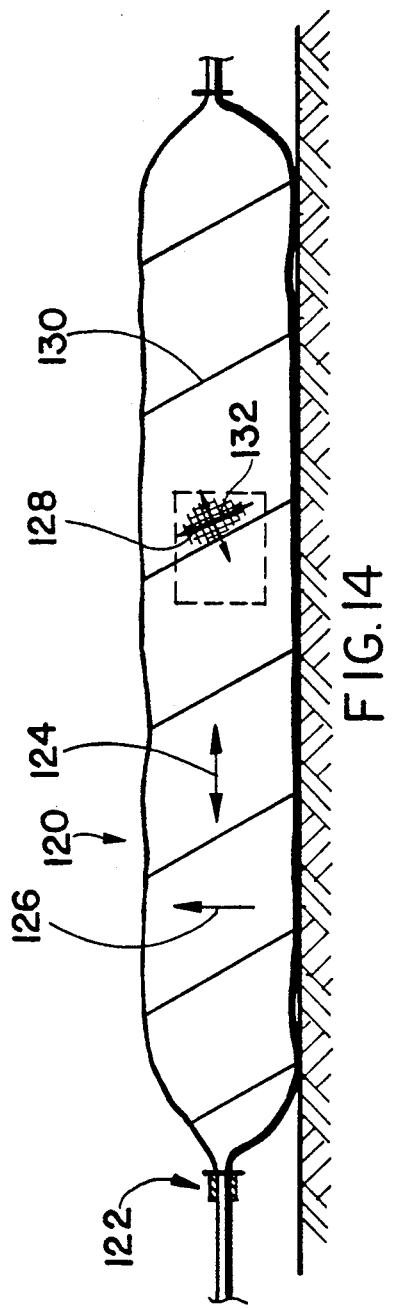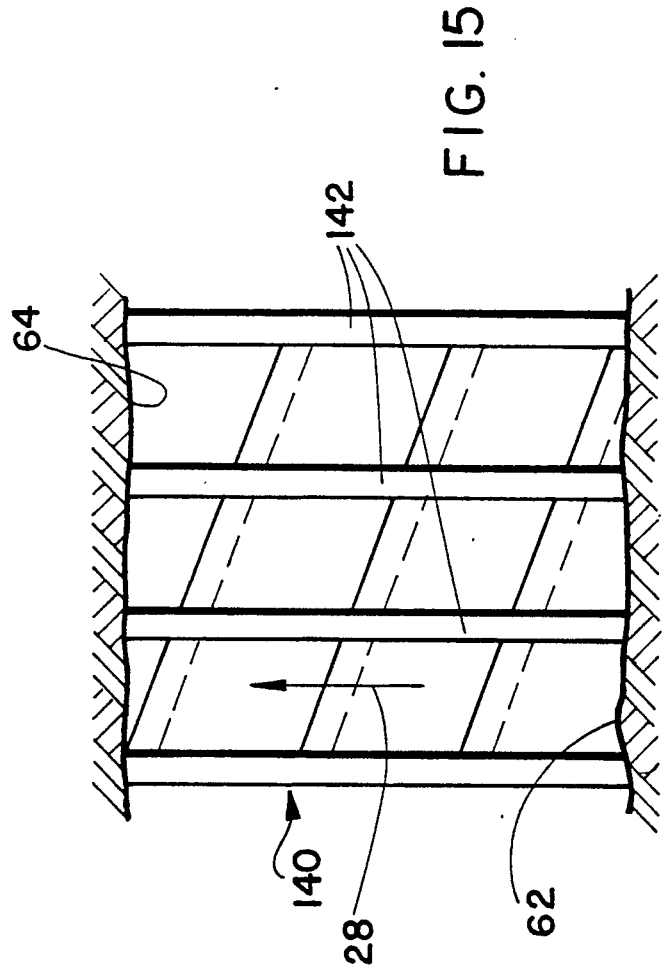

METHOD AND APPARATUS FOR MAKING A CONTINUOUS TUBE OF FLEXIBLE SHEET MATERIAL

This invention relates to a method of making a continuous tube of flexible sheet material. In particular it relates to a method of making a continuous tube of flexible textile sheet material, to an apparatus for carrying out the method, to a continuous tube of flexible textile sheet material and to a bag made from the tube of flexible textile sheet material.

According to one aspect of the invention, there is provided a method of making a continuous helically wound tube from a flexible sheet of textile material, the sheet having a pair of substantially parallel side edges and thereby being of substantially uniform width, the method comprising the steps of winding the sheet helically into a tubular form so that adjacent sides of adjacent helical convolutions overlap each other, the inner faces of the helical convolutions being supported by support means defining at least two spaced apart elongate support surfaces; and simultaneously joining the overlapped sides together along their lengths at a position intermediate the support surfaces to form a continuous tube.

The method may comprise the steps of supplying the sheet from a continuous supply;

feeding the sheet from the continuous supply by feed means on to two support surfaces provided by a pair of laterally spaced apart support members, a support axis defined by the centre-line between the support members being at a pre-determined helix angle with respect to a sheet axis defined by the centre-line of the sheet leaving the continuous supply, whereby the degree of overlap of the sides of the helical convolutions is determined by the helix angle; and winding the sheet helically around the proximate ends of the support members into the tubular form by contacting at least part of the helical convolutions with the feed means, the feed means also progressing the formed tube axially along and off the distal ends of the support bars.

The degree of overlap or overlay of the sides of the helical convolutions or turns will depend on the specific end product requirements and can vary from a few millimeters to almost the total fabric width. The degree of overlap will be selected to meet the forces which the tube is required to withstand in use and this will determine the appropriate helix angle for a given sheet width and tube circumference.

The angular direction of the support or guide members with respect to the direction of the sheet leaving the continuous supply may be adjustable, thereby permitting adjustment of the helix angle and hence the degree of overlap of the sides of the helical convolutions.

Similarily, the lateral spacing between the support members may be adjustable, thereby permitting adjustment of the circumference of the formed tube.

The support members may be supported in substantially parallel spaced relationship, thereby permitting the formation of a tube of substantially uniform circumference.

In another embodiment, the support members are supported in angular spaced relationship, at least one of the support members being capable of moving progressively towards, or outwards from, the or each other, thereby permitting the formation of a conical tube. The support members may be set convergingly or divergingly.

Preferably, the support surfaces are non-rotatable. The support members may be non-rotatable support or guide bars. In another embodiment, the support surfaces are provided by one or more support members which are, for example, a series of wheels set to a pre-determined angle to permit axial movement of the formed tube along the support members in the take-off direction.

It will be appreciated that the method permits the formation of tubes of widely varying characteristics by varying the sheet width and/or the tube circumference and/or the degree of overlap of the sides of the helical convolutions and/or the helix angle.

The textile sheet material may be a water-permeable or water-impermeable fabric. The fabric may be coated, for example, with a polymeric or rubber layer, or a wax. The fabric may also be a laminate or composite material.

The textile sheet material may comprise a flat-woven fabric, a non-woven fabric or a knitted fabric. The fabric may have a mass of from 20 $g/m^2$–1000 $g/m^2$, or possibly greater. The fabric can be produced from tape mono-or multi-filament yarns, staple fibre yarns and it could comprise synthetic or natural fibres, or glass or mineral fibres, or blends thereof.

The woven fabric may have a plain weave structure, a twill weave structure, a sateen weave structure, or the like. The particular weave structure employed will depend on the particular end-use for which the tube is intended. This also applies for variations in structure of the knitted and non-woven fabrics.

The fabric may have a plurality of bands or strips of warp or weft strands of a relatively higher mass or density alternating with warp or weft strands of a relatively lower mass or density. In use, this can assist filtration through the wall of the tube. The fabric may also contain support straps formed as an integral part of the fabric during its manufacture, or which are inserted or added at a subsequent stage. The support straps are used for handling purposes and for securing/fastening of the tube during installation and use.

The joining step may be effected by a mechanical process. According to one embodiment, the joining step is effected by sewing means. Instead, for certain types of material, the joining step may be effected by means of ultrasonic or HF welding.

The sewing together of the overlapped sides of the helical convolutions or turns may comprise sewing at least one, eg a plurality, of sew-lines, each extending parallel to the side edges and substantially parallel to each other, along the sides. In one embodiment, there will be three sew-lines spaced apart from each other. The sides may be arranged to form a so-called LSa seam configuration. For certain fabrics, an LSa seam has a higher seam strength than other seam configurations eg SSn, SSa, LSb and LSc. Depending on the type of fabric, other seams may be stronger and may therefore be used.

The sewing together of the overlapped sides of the helical convolutions may be by means of an interlooping of sewing thread in the sewing operation, eg a chain stitch. Instead the sewing may be by means of an interlacing of sewing thread, eg a lock-stitch. Other types of stiches e.g. overlock, hard, etc. may be used. The sewing thread may consist of tape, or monofilament or multifilament or staple fibres, of nylon, polyester, high density polyethylene (HDPE), polypropylene, polytetrafluoroethylene, or any other polymeric material. It could also be of glass or mineral fibres, or natural fibres such as cotton, jute, wool, etc. The frictional properties and the stress-strain behaviour of the sewing thread have a marked effect on the strength of a seam employing such a thread. In most cases the sewing thread would be a multifilament synthetic yarn (e.g. nylon or polyester).

In one embodiment the sewing thread is a 3-ply multifilament nylon thread of specification TK20 which is manufactured and supplied in South Africa by Natal Thread Company. In this embodiment, the sewing is effected by means of a chain-stitch.

The sewing may be effected by means of a sewing machine having at least one needle, preferably a plurality of needles, e.g. three needles.

According to a further aspect of the invention, there is provided an apparatus for making a continuous helically wound tube from a flexible sheet of textile material, the sheet having a pair of substantially parallel side edges and thereby being of substantially uniform width, the apparatus comprising support means defining at least two laterally spaced apart elongate support surfaces;

feed means for feeding the sheet on to the support means so as to wind the sheet into a helically wound tubular form in which adjacent sides of adjacent helical convolutions overlap; and joining means positioned intermediate the support surfaces for joining the overlapped sides together to form a continuous tube.

More particularly, the apparatus may comprise a continuous supply of the sheet, the centre-line of the sheet leaving the continuous supply defining a sheet axis;

two support surfaces provided by a pair of laterally spaced apart support members mounted on a support, the centre-line between the support members defining a support axis and the support axis being at a pre-determined helix angle with respect to the sheet axis whereby the degree of overlap of the helical convolutions is determined by the helix angle;

feed means in the form of a pair of rotatably mounted driving nip rollers for feeding the sheet from the continuous supply on to the proximate ends of the support members, winding the sheet around them into the tubular form, and progressing the formed tube axially along and off the distal ends of the support members; and the driving nip rollers and the joining means being operable in synchronism with each other.

The driving nip rollers may include an outer driven nip roller in contact with the outer faces of at least part of the helical convolutions and an inner idler nip roller in contact with the corresponding inner faces of the helical convolutions.

The support or guide members may be mounted adjustably on the support to permit adjustment of the angular direction of the support members with respect to the direction of the sheet leaving the continuously supply, thereby permitting adjustment of the helix angle and the degree of overlap of the sides of the helical convolutions. Similarily, the support members may be mounted adjustably on the support to permit adjustment of the lateral spacing between the support members, thereby permitting adjustment of the circumference of the formed tube.

The support members may be mounted on the support in substantially parallel spaced relationship, thereby permitting the formation of a tube of substantially uniform circumference.

In another embodiment, the support members are supported in angular spaced relationship, at least one of the support members being capable of moving progressively towards, or outwards from, the or each other, thereby permitting the formation of a conical tube. The support members may be set convergingly or divergingly.

Preferably, the support surfaces are non-rotatable. The support members may be non-rotatable support or guide bars. In another embodiment, the support surfaces are provided by one or more support members which are, for example, a series of wheels set to a pre-determined angle to permit axial movement of the formed tube along the support members in the take-off direction.

The joining means may be a sewing machine. In other embodiments, other mechanical joining means may be employed. Also, for certain types of materials, the joining means may be ultrasonic or HF welding equipment. Hot melt adhesives may also be used.

The invention extends to a continuous helically wound tube whenever made from a flexible sheet of textile material by the method or apparatus described above.

It will be appreciated that the circumference of the tube is not limited and a tube of virtually any circumference can be made in accordance with the invention from a flexible sheet of textile or fabric material. The method and apparatus of the invention are useful for making a tube of relatively large circumference, for example, up to 10 meters or more, from a sheet made on traditional weaving looms, knitting machines, or nonwoven sheet machines, where there is a definite limit imposed on the sheet width by the specific machine. The method and apparatus also permit the conversion of narrow fabric sheets into very fine tubes, down to a circumference of a few millimeters.

The tube may be treated after its formation. In one embodiment, the tube is treated by coating with a polymeric material to act as a liner, for example, for the transportation of liquids.

The tube may be used for a variety of industrial, technical, or geotextile applications. More specifically, the tube may be used to perform one of the following functions viz. back-filling or grouting in mining, wall dams, slope protection, pillars, coastal protection, a mattress for controlling erosion, for forming a bag for transportation, grout-filled mats or cushions for ground support, fabric forms for pile construction, et. al.

In one embodiment, the tube is for forming a bag suitable for use in back-filling in mining operations. In back-filling, a back-filling material such as wet mine sludge or slurry, which is typically the tailings from an associated metallurgical processing plant, is charged into a back-filling bag made from the tube of sheet fabric material. The back-filling bag is located in a stope of a mine between a foot wall and a hanging wall. Water in the sludge or slurry drains or percolates out of the back-filling bag which is typically water-permeable, by the internal fluid pressure therein. The particles of the sludge or slurry are retained in the bag, which in this condition serves as a regional underground mine-support. Typically, this support supports the hanging wall of a stope, rearwardly of an advancing stope face.

In another embodiment the bag may be for forming a wall dam for damming liquid. The bag is laid loosely on the ground, horizontally extending, and then filled with a slurry, or a dry material such as sand, soil, or other solid particles, to form the wall.

In yet another embodiment, the tube may be for forming a bag suitable for use in grouting, i.e. as a grout bag. In one form of grouting, the bag is positioned with its axis vertically extending and filled with a slurry of a particulate material, which is grout or concrete, to form a pillar for supporting a roof or hanging wall. In this application, the material of the wall of the bag is water-impermeable and retains the grout or concrete to form a pillar. In another form of grouting, the grout bag is positioned horizontally.

Accordingly, the invention also extends to a bag which comprises a length of a tube whenever made by the method or apparatus described above. At least one end of the tube length may be closed off to form the bag. Both ends of the tube length may be closed off to form the bag, for example, an inlet tube being provided at one side of the bag. The tube length will depend on the particular application of the bag.

The tube length may be closed by folding one or both ends radially inwardly or outwardly and then tied, sewn, or welded etc. e.g. with wire, rope or string, etc.

The invention will now be described, by way of example, with reference to the accompanying diagrammatic drawings, in which:

FIG. 1 shows a front elevation of a continuous tube made in accordance with the method and apparatus of the invention;

FIG. 2 shows a sectional elevation through section II—II of FIG. 1;

FIG. 14 is a front elevation of a bag in accordance with the invention for functioning as a wall dam; and FIG. 15 is a front elevation of a bag forming a pillar for supporting a roof or hanging wall.

Figure 3:
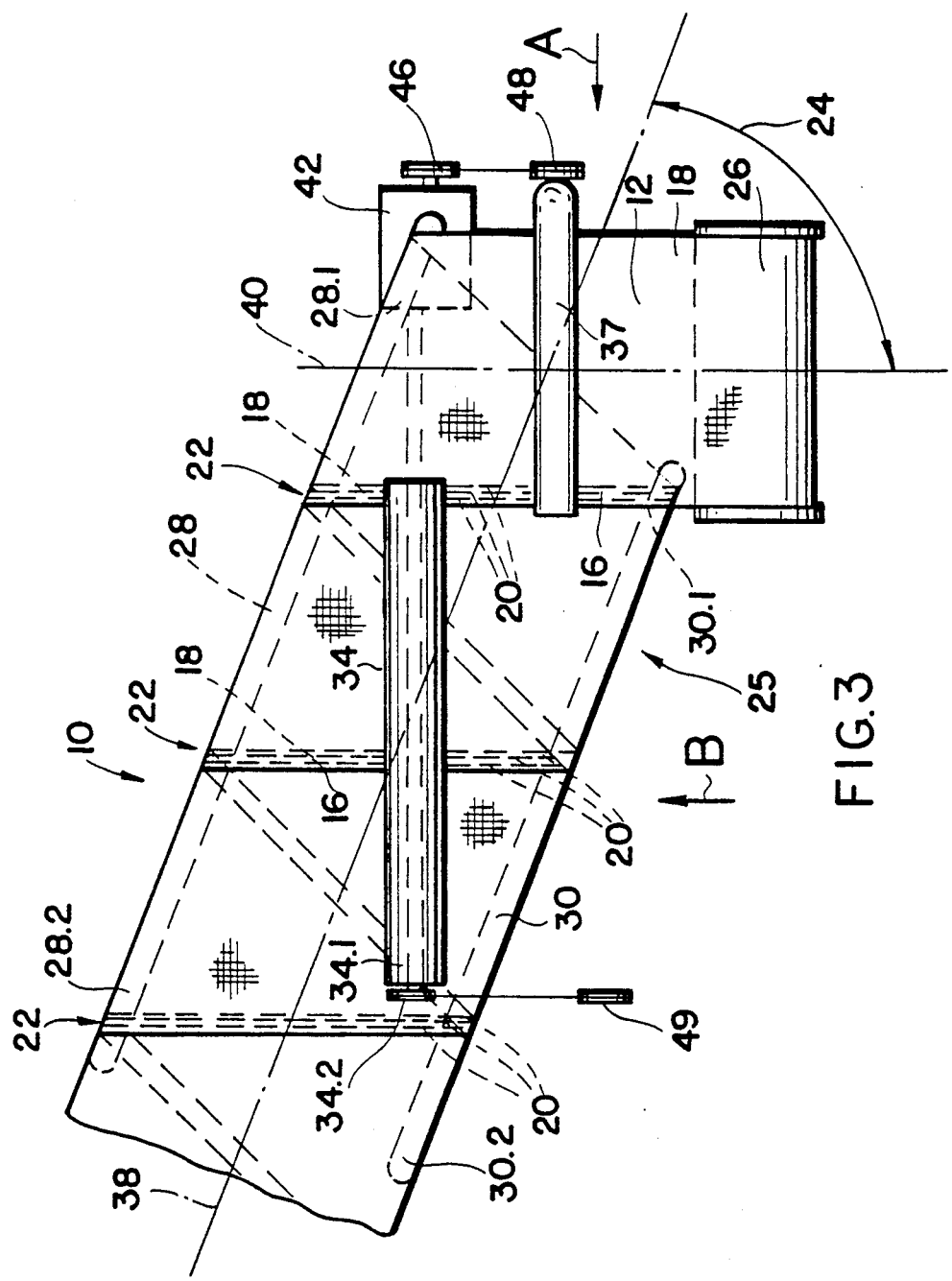
FIG. 3 shows a plan view of an apparatus for carrying out the method of the invention.

With reference to FIG. 1, reference numeral 10 refers generally to a continuous tube, sleeve or sock of flexible woven textile sheet material made in accordance with the invention.

The tube 10 is made by helically winding a continuous flat flexible textile sheet of textile material 12 having a pair of substantially parallel side edges and thereby having a substantially constant width 14 into a tubular form so that adjacent sides 16, 18 of adjacent helical convolutions or turns overlap or overlay each other. The overlapped sides 16 and 18 are simultaneously joined together along their lengths to yield a continuous tube 10 of flexible material.

The sides 16 and 18 are joined together by sewing. A single sew-line 20 may be used. Instead a plurality of sew-lines 20 may be used. In the case where a plurality of sew-lines are used, the sew-lines are substantially parallel to each other and to the side edges of the sheet material. The seam configuration 22 is an LSa seam (FIG. 2) in which the forward side 16 of a helical convolution or turn overlaps the rearward side 18 of the preceding helical convolution or turn.

The longitudinal axis of the tube 10 is indicated by reference numeral 28. Thus the seam 22 does not extend along the axis 28 of the tube 10, but rather the seam 22 extends helically at an angle 24 to the axis 28. In the embodiment shown, the angle 24 is 70°.

Figure 4:
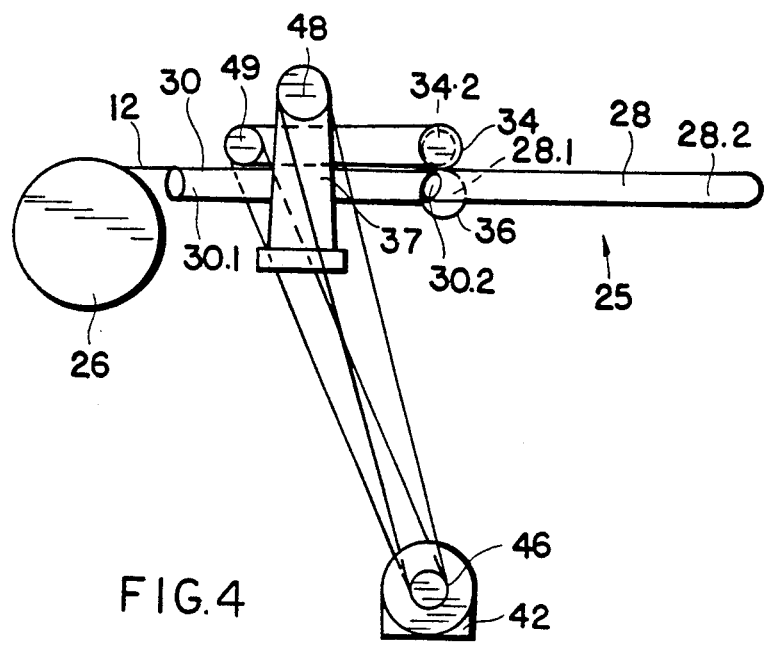
FIG. 4 shows an end view corresponding to FIG. 3 in the direction of arrow A, the helical convolutions of the wound sheet, and the formed tube, being omitted for clarity.
Figure 5:
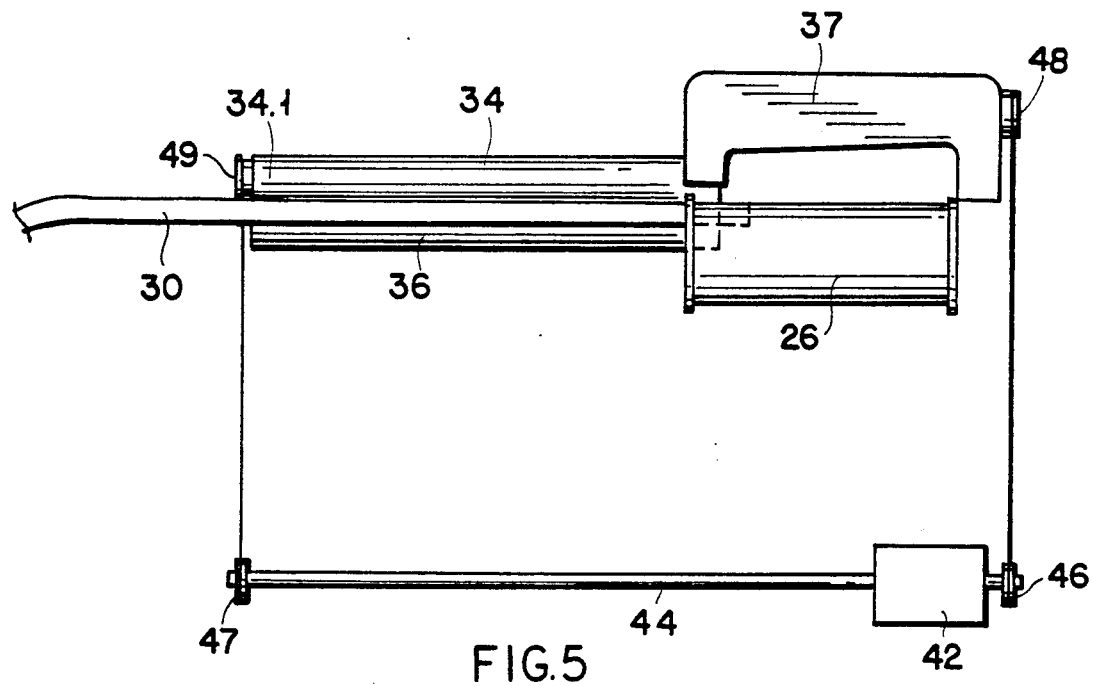
FIG. 5 shows a front view corresponding to FIG. 3 in the direction of arrow B, the helical convolutions of the wound sheet, and the formed tube, being omitted for clarity.

With reference to FIGS. 3, 4 and 5, in which the same reference numerals refer to the same parts shown in the previous drawings, an apparatus suitable for making the tube 10 according to the method of the invention is designated generally by reference numberal 25.

The apparatus 25 comprises a continuous supply in the form of a roll 26 of sheet 12, support means defining two spaced apart elongate surfaces provided by a pair of laterally spaced apart, non-rotatable support or guide members 28, 30, feed means in the form of a pair of rotatably mounted driving nip rollers 34, 36, and joining means in the form of a sewing machine 37 positioned intermediate the support bars 28, 30.

The support members 28, 30 are conveniently bars of metal or a composite material and have a diameter of 80 mm and a length of 4 m. They are supported adjustably on a support (not shown) and are set substantially parallel to each other. The centre-line between the support bars 28, 30 defines a support axis 38. The centre-line of the sheet 12 leaving the roll 26 defines a sheet axis 40. As shown in FIG. 3, the angle between the support axis 38 and the sheet axis 40 is set at a pre-determined helix angle 24.

In this embodiment, the helix angle 24 is 70°.

The type of sewing machine 37 used is not critical. Typically, it has a plurality of sewing needles e.g. three needles (not shown).

The apparatus includes an electric motor 42 positioned beneath the sewing machine 37 and having a driving shaft 44, a driving pulley 46 at the end of the shaft nearest the sewing machine, and a driving pulley 47 at the end of the shaft remote from the sewing machine 37.

The outer nip roller 34 has a pulley 34.2 fast with its end 34.1 remote from the sewing machine 37 and is drivingly connected to the motor shaft 45 via an intermediate double track pulley 49 and the pulley 47 and is positioned so that, in use, it is in contact with at least part of the outer faces of the helical convolutions or turns. The nip roller 36 is an inner idler nip roller positioned so that, in use, it is in contact with the corresponding inner faces of the helical convolutions or turns.

The sewing machine 37 is also drivingly connected via a drive wheel 48 to the pulley 46, the arrangement being such that the the driving nip rollers 34, 36 and the sewing machine 37 are, in use, driven in synchronism with each other. It will be noted that the driving nip rollers 34, 36 are at right angles to the seam 22 and the sewing is effected parallel to the seam 22.

In use, the driving nip rollers 34, 36, driven by the motor 42 and the associated pulley system, feed the flat sheet 12 from the continuous supply 26 on to the proximate ends 28.1, 30.1 of the support or guide bars 28, 30 and wind the sheet helically over them into a tubular form in which adjacent sides 16, 18 of adjacent helical convolutions or turns overlap each other to a degree determined by the helix angle 24. The inner faces of the helical convolutions are thus supported at two spaced positions defined by the support bars 28, 30 and freely suspended between the support bars 28, 30. The overlapped sides 16, 18 of the helical convolutions or turns are simultaneously sewn together with stitches 20 by the sewing machine 37, driven in synchronism with the driving nip rollers 34, 36 by the motor 42 and the associated pulley system, to form the helical seam 22 and the tube 10. The driving nip rollers 34, 36 also feed the tube axially and progressively along the support bars 28, 30 and off their distal ends 28.2, 30.2. Take-off means (not shown) takes off the formed tube 10 from the guide bar distal ends 28.2, 30.2.

It should be noted that the support bars 28, 30 are mounted adjustably on the support so that their angular direction with respect to the direction of the sheet 12 leaving the continuous supply 26 can be adjusted to adjust the helix seam angle 24 and the degree of overlap of adjacent helical convolutions. Moreover, the lateral spacing between the support bars 28, 30 can be adjusted to adjust the circumference of the formed tube 10. In the embodiment shown in the drawings, the support bars 28, 30 are mounted on the support in substantially parallel relationship. In another embodiment, the support bars 28, 30 are mounted in angular relationship on the support, at least one of the support bars 28, 30 being capable of moving towards, or outwards from, the or each other, permitting the formation of a conical tube. The support bars 28, 30 may be set convergingly or divergingly.

In another embodiment, the support surfaces are provided by support members which are, for example, a series of wheels set to a pre-determined angle to permit axial movement of the formed tube along the support members in the take-off direction.

In an example using the apparatus illustrated in FIGS. 3 to 5, the warp yarns used for weaving the flexible sheet material of the tube have 600 dtex fineness monofilament HDPE. The weft yarns used for the weaving have 1100 dtex fineness multifilament polyester. The warp yarns extend at a helix angle of 70° to the tube axis 28 and the weft yarns extend at an angle of 20° to the tube axis 28. The fabric is a flat-woven material. The fabric sett (picks and ends) properties are as follows:

9,5 picks/meter weft yarn; and
26 ends/meter warp yarn.

The fabric 12 has the following breaking strength and extension properties:

Warp: 3533N/50 mm, extension at break of 24.8%
Weft: 3067N/50 mm, extension at break of 28.7%

The seam has a strength of 1850N/50 mm. The sewing thread is a 3-ply multifilament nylon thread of specification TK20 which is manufactured and supplied in South Africa by Natal Thread Company. The sewing is effected by an interlooping stitch which is a chainstitch.

The tube 10 has a circumference of 5.7 m corresponding to a diameter of 1,815 m, the effective width or pitch of the sheet material when it is wound into the helical form being 1.95 m. The width 14 of the sheet fabric material 12 is 2.0 m. The lateral spacing between the support bars 28, 30 is half the tube circumference i.e. approximately 2.8 m. The overlap between adjacent sides of adjacent convolutions is 50 mm. The speed of the apparatus is dictated by the speed of the sewing machine and in this example the speed was about 5-6 meters per minute.

Figure 6:
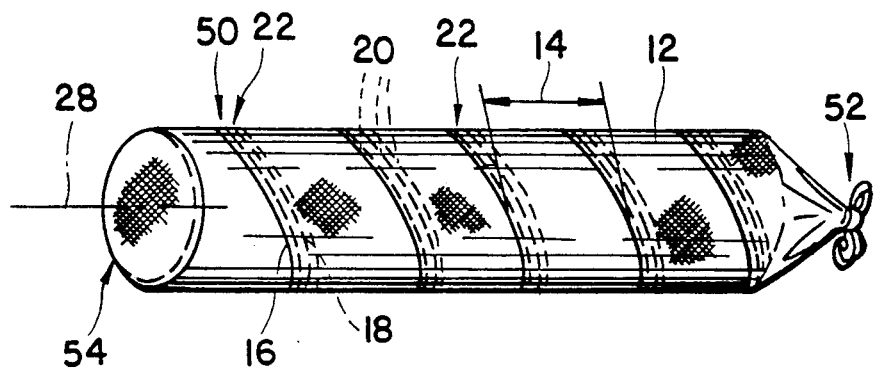
FIG. 6 shows a three-dimensional view of a back-filling bag in accordance with the invention.

With reference to FIG. 6, the continuous tube 10 is formed into a back-filling bag 50 by closing off one end 52 of the tube 10 by folding it radially and tying the end 52 together using wire.

Figure 7:
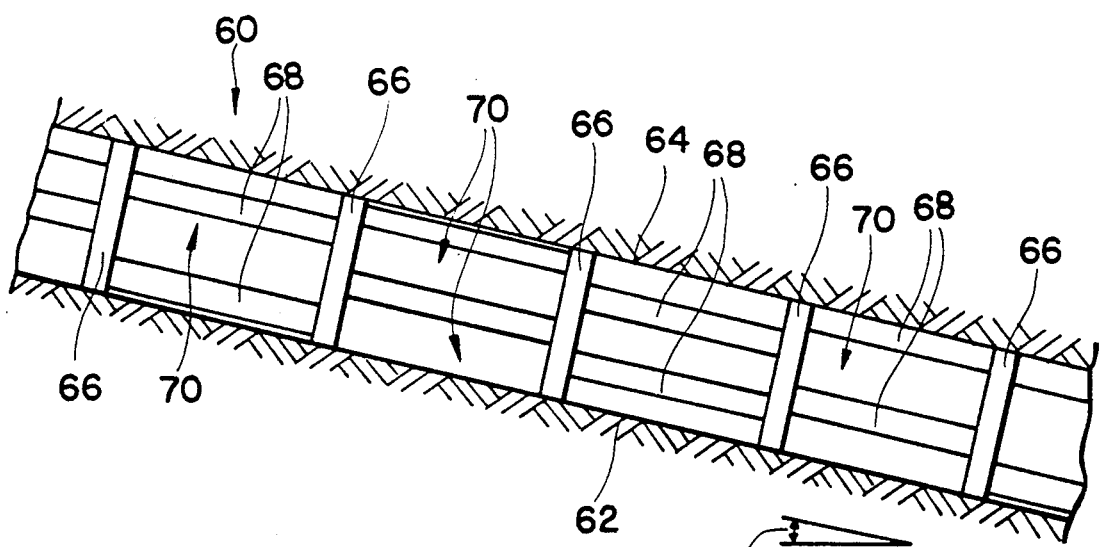
FIG. 7 shows a sectional side elevation of a stope in a mine showing a front elevation of an enclosed back-filling space viewed from the stope face.

In FIG. 7 the same reference numerals are used to refer to the same components shown in the earlier drawings, unless otherwise specified. Reference numeral 60 refers to a typical stope in a gold mine. The stope 60 is inclined at an angle 61 which is typically 0°-26°, the stope angle following the angle of the gold reef. The area for back-filling is spaced rearwardly from the working face (not shown) and the stope height is typically about 0.75 m-3.0 m, or possibly more.

A plurality of hydraulic props 66 are positioned in the stope extending up from a footwall 62 to a hanging wall 64 to support said hanging wall. A plurality of horizontally extending timber members 68, which are spars or beams, are then positioned up against the props 66. The spars 68 are positioned behind the props 66 when viewed from the direction of the stope face.

A three-dimensional space within which the back-filling bag is located is thus defined above and below by the hanging wall 64 and footwall 62 respectively. The rear end of the space is defined by a previously installed, hardened back-fill bag (not shown) which has been placed in position in the stope 60 and the leading end is defined by the props 66 and spars 68.

Each prop 66 is typically spaced about 1600 mm away from its adjacent prop 66 and the spars 68 are vertically spaced about 200 mm apart defining apertures 70 of about 1600 mm×200 mm through which the wall of the bag 50 can be outwardly deformed.

The bag 50 is placed into the three-dimensional space with the tied end being placed towards the lower end of the stope, and then charged with slurry through the open mouth of the bag. The pressure exerted on the wall of the bag is that of the sludge of specific gravity of 1.8 and the hydrostatic head of the sludge contained within the bag.

In FIGS. 8 to 13 the same reference numerals refer to the same components as in the previous drawings, unless otherwise specified.

Figure 8:
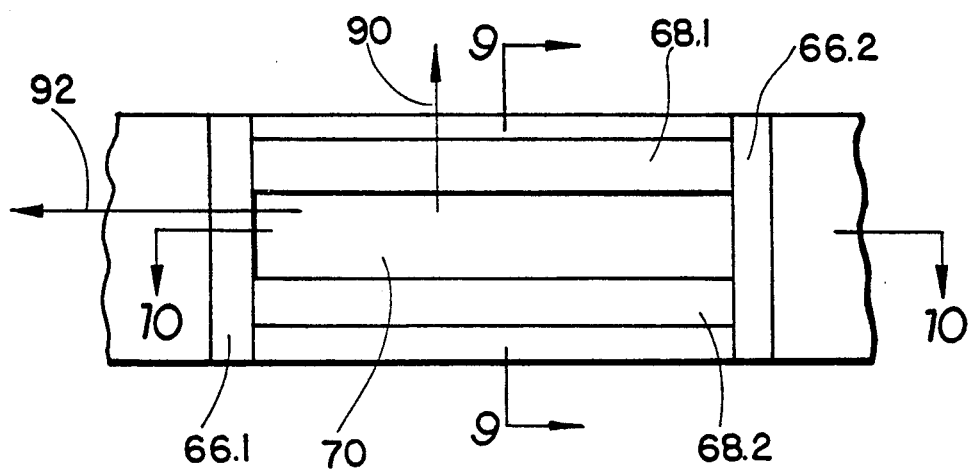
FIG. 8 is a front elevation of an aperture of the back-filling enclosure shown in FIG. 7, having a wall of a back-filling bag bulging outwardly therethrough.

In FIG. 8, one such aperture 70 having the wall of the back-filling bag 50 bulging outwardly therethrough is shown. The aperture is defined by adjacent props 66.1 and 66.2 and adjacent spars 68.1 and 68.2.

Figure 9:
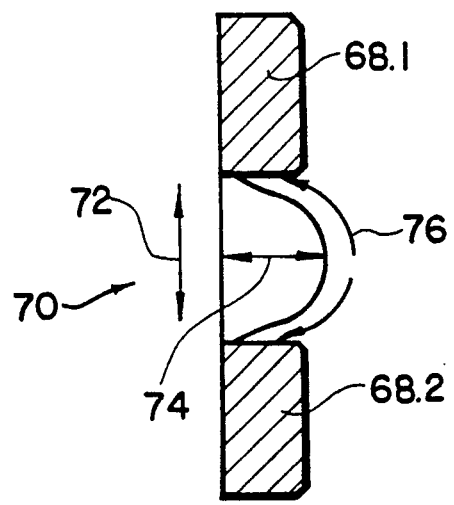
FIG. 9 is a section through IX—IX of FIG. 8.
Figure 10:
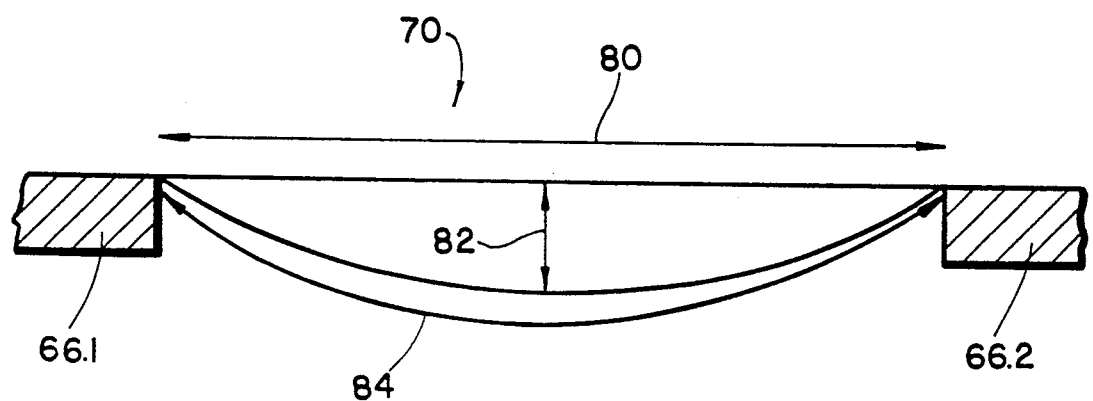
FIG. 10 is a section through X—X of FIG. 8.

FIG. 9 is an end elevation showing deformation of the wall of the bag as it bulges outwardly through the aperture 70. The upper and lower limits of the aperture 70 are defined by adjacent spars 68.1 and 68.2 respectively. Reference numeral 72 shows the original fabric length. Reference numeral 74 shows the radially outward extent of the bulging and reference numeral 76 shows the stretched length owing to said outward bulging. FIG. 10 is a sectional plan view of the aperture and associated wall of the bag of FIG. 8 as it bulges outwardly through the aperture, the length of the aperture 70 being defined by adjacent props 66.1 and 66.2. Reference numeral 80 shows the original fabric length. Reference numeral 82 indicates the radially outward extent of the bulging and reference numeral 84 indicates the stretched length owing to said outward bulging. The extent of the radially outwardly bulging indicated by 82 is the same as that indicated by 74. Thus the ratio of the stretched fabric length to original fabric length is much smaller in section X than section IX. As far as bag strength is concerned, the limiting factor is thus the strength and extension (at break) in the direction indicated by reference numeral 90 in FIG. 8, i.e. the breaking strength and breaking extension.

In existing back-fill bags of which the Applicant is aware, the seam runs in the direction 92, i.e. parallel to the tube axis 28. As described immediately above, the greatest forces will in use be exerted on the bag transverse to this seam 22, which transverse forces, i.e. in direction 90, will tend to rupture a seam running in the direction 92. It is well known that the strength of any seam is typically only 40-70% of the strength of the fabric 12 by itself and without a seam. Thus the seam running in the direction 92 has an adverse effect on the overall strength of the bag.

The Applicant thus believes that it will be advantageous to have the seam as close as possible to the direction 90 rather than in direction 92 which is the case in existing back-fill bags of which the Applicant is aware. The Applicant believes that a reasonable seam strength and fabric strength compromise can be achieved by manufacturing the bag 50 according to the method of the invention described above.

Figure 11:
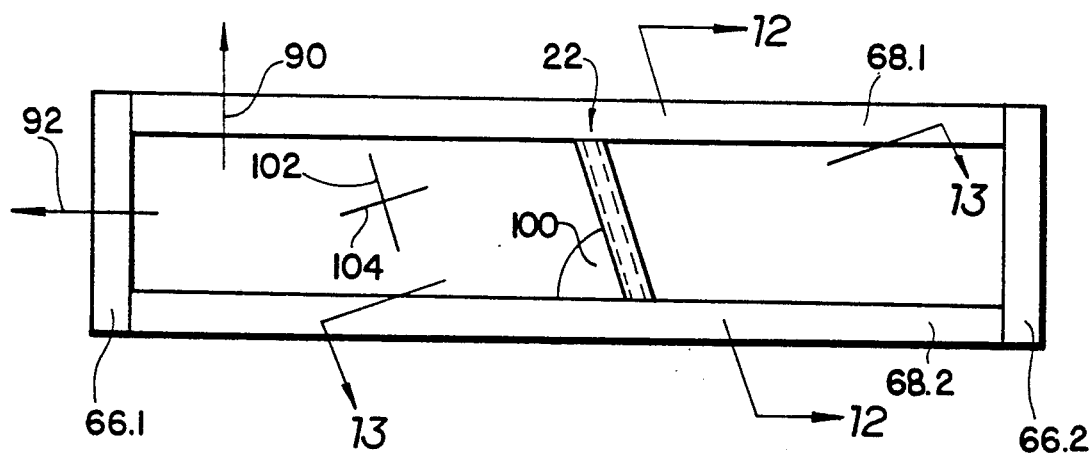
FIG. 11 is a front elevation (similar to that of FIG. 8) of an aperture having the wall of a back-filling bag in accordance with the invention bulging outwardly therethrough.

FIG. 11 is a front elevation of portion of the bag 50 in accordance with the invention having a helically extending seam, projecting through an aperture measuring 1200 mm×250 mm. The angle of the seam 22 indicated by reference numeral 100 is at 70° to the axis of the bag 50 and the direction indicated by 92, and at 20° to the preferred direction of the seam which is indicated by 90. Thus the direction of the warp strands 102 is also at 70° to the direction indicated by 92 and the direction of the weft strands 104 is at 20° to the direction indicated by 92.

Figure 12:
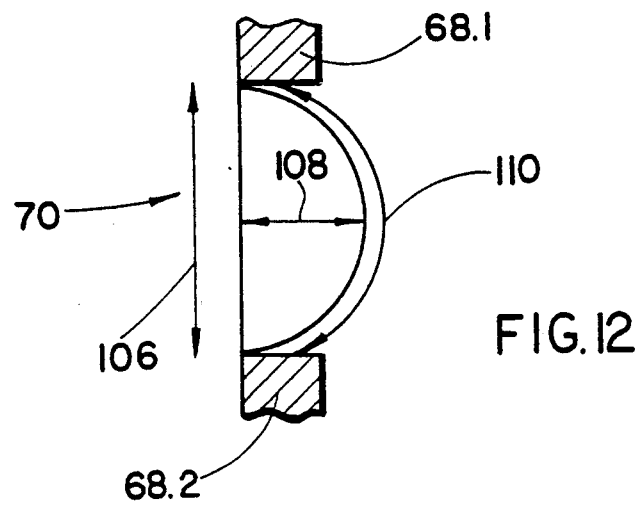
FIG. 12 is a section through XII—XII of FIG. 11.

FIG. 12 is an angled sectional end elevation of the aperture 70 and associated wall of the bag 50 of FIG. 11, showing the extent of the deformation of the warp strands when they are subjected to the breaking stress in warp of 3533N/50 mm. An extension 24,8% thereof is effected, as described above.

Figure 13:
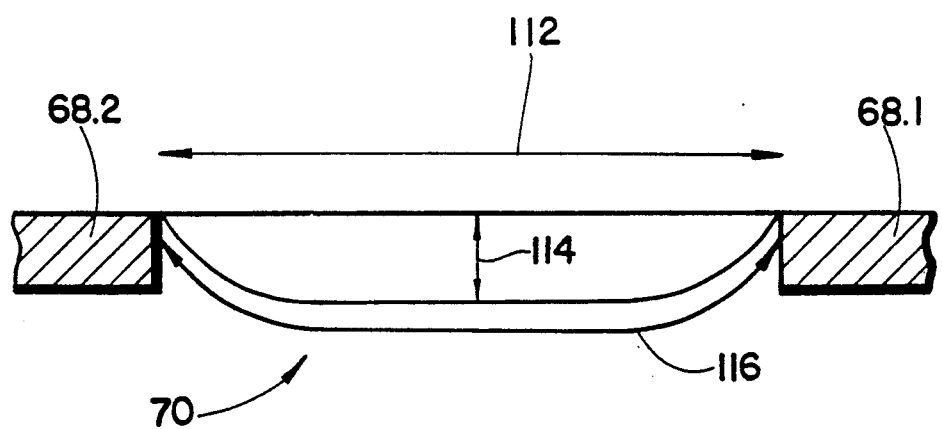
FIG. 13 is a section through XIII—XIII of FIG. 11.

FIG. 13 is an angled sectional plan view taken perpendicular to the seam 22 and indicating the extent of deformation of the weft strands, when the fabric is subjected to the breaking stress in warp.

The dimensions corresponding to the respective reference numerals in FIGS. 12 and 13 are as follows: 106 is 266 mm; 108 is 84,5 mm; 110 is 332 mm; 112 is 730 mm; 114 is 84,5 mm; and 116 is 755,6 mm.

However, when actual breaking stress is reached for the warp strands, the extension of the weft strands is only 3,5% and accordingly the weft forces are only 374N/50 mm. The seam is therefore also loaded with the same force of 374N/50 mm, which is comfortably below the seam strength specified above. Thus the limiting constraint in the strength of the back-fill bag is the strength of the fabric in the direction of the warp strands. The fabric in the direction of the weft strands has a safety factor of 8,2 and the safety factor of the seam is 7,3.

With reference to FIG. 14, the same reference numerals refer to the same components as in FIGS. 1 to 13 unless otherwise specified. In this example a bag in accordance with the invention is used as a wall dam (or similarily for slope or coastal protection). In FIG. 14, reference numeral 120 refers to a loosely laid bag lying substantially horizontally on the ground. The bag 120 has an inlet 122 at an end thereof through which sludge is introduced to the bag 120. The bag has the same dimensions and fabric strength properties as the bag of Example 1 described above. The longitudinal stresses in the direction 124 are believed to be half the load of the radial stresses in the direction 126. In the bag the warp strands extend in the direction indicated by 128, parallel to the direction of the seam 130 and the weft strands extend normal to the direction 128, namely in the direction 132.

With reference to FIG. 15, the same reference numerals refer to the same components as in the previous drawings, unless otherwise specified. Reference numeral 140 refers to a bag similar to the bag described with reference to FIGS. 1 to 13 and FIG. 14, for forming a pillar to support a roof or hanging wall. The bag is positioned having its longitudinal axis 28 vertically extending, and having each of its ends abutting a foot wall 62 and a hanging wall 64 respectively. The bag 140 is supported in its vertically extending position by a frame 142. Instead, however, the bag 140 may be free standing. It may also be supported by horizontal rings or loops or straps, etc. In use, the bag 140 is used in substantially the same manner as the bags described above.

Bags manufactured in accordance with the invention have the advantage that a single sheet or roll of fabric, having a substantially constant width, can be used to manufacture tubes and bags having a wide range of diameters. The invention thus obviates the need for large looms for producing wide width sheets of fabric for manufacturing large diameter bags and it eliminates the need to join a plurality of sheets together to provide a composite sheet having the required width.

Moreover, it is possible to manufacture a tube having in effect a plurality or even a multiplicity of layers by having a high degree of overlap of said adjacent layers.

Back-filling bags manufactured in accordance with the invention will not have an axially extending seam along the length of the bag. Hence, should a seam fail or rupture, it propagates typically only a short distance before stabilising and not along the entire axial length of the bag as is the case with other bags of which the Applicant is aware. Typically such a rupture will stabilise when it reaches either the foot wall or hanging wall of the stope. Further, neither the warp nor weft yarn strands run in the direction of the axis of the bag which is the principal load-bearing direction. Accordingly, load is more evenly distributed between the warp and weft strands and failure or rupture is less likely to occur.

It should be appreciated that the optimum parameters of the tube 10, and its optimum method of use, will vary according to the particular application and will be determined by routine experimentation by a person skilled in the art, so that the tube will meet the forces involved in the particular application in an optimal manner. For example, for each particular application, the optimum fabric material, type of fabric, seam configuration, sewing thread, type of sewing stitch, helical seam angle, tube dimensions, etc. will be determined by said routine experimentation in each case. Thus, the fabric may be geotextiles, industrial textiles, technical textiles, etc. apart from those already mentioned. Other applications of the tube include fire hoses and tubes for transportation of materials and liquids.

We claim:

1. A method of making a continuous helically wound tube from a flexible sheet of textile material, the sheet having a pair of substantially parallel side edges and thereby being of substantially uniform width, the method comprising the steps of supplying the sheet from a continuous supply;

feeding the sheet from the continuous supply by feed means on to support means defining at least two laterally spaced apart elongate non-rotatable support surfaces provided by at least two laterally spaced apart non-rotatable support members, a support axis defined by the centre-line between the support members being at a pre-determined helix angle with respect to a sheet axis defined by the centre-line of the sheet leaving the continuous supply and the continuous supply being nonorbital with respect to the support axis, whereby the degree of overlap of the sides of the helical convolutions is determined by the helix angle;

winding the sheet helically around the proximate ends of the support members into a tubular form by contacting at least two of the helical convolutions with the feed means, so that adjacent sides of adjacent helical convolutions overlap each other, the inner faces of the helical convolutions being supported by the support members, and the feed means being located so as to maintain that portion of the formed tube upstream of the feed means in tension to progress the formed tube axially along and off the distal ends of the support members; and simultaneously joining the overlapped sides together along their lengths at a position intermediate the support members to form a continuous tube.

2. An apparatus for making a continuous helically wound tube from a flexible sheet of textile material, the sheet having a pair of substantially parallel side edges and thereby being of substantially uniform width, the apparatus comprising a continuous supply of the sheet, the centre-line of the sheet leaving the continuous supply defining a sheet axis;

support means defining at least two laterally spaced apart elongate non-rotatable support surfaces provided by at least two laterally spaced apart non-rotatable support members mounted on a support, the centre-line between the support members defining a support axis the support axis being at a pre-determined helix angle with respect to the sheet axis and the continuous supply being nonorbital with respect to the support axis, whereby the degree of overlap of the helical convolutions is determined by the helix angle;

feed means in the form of a pair of rotatably mounted driving nip rollers for feeding the sheet from the continuous supply on the proximate ends of the support members and winding the sheet around them into a helically wound tubular form by contacting at least two of the helical convolutions, so that adjacent sides of adjacent helical convolutions overlap the driving nip rollers being located so as to maintain that portion of the formed tube upstream of the driving nip rollers in tension to progress the formed tube axially along and off the distal ends of the support members; and joining means positioned intermediate the support members for joining the overlapped sides together to form a continuous tube, the driving nip rollers and the joining means being operable in synchronism with each other.

* * * * *